March 13, 1956  J. POEDER  2,737,658
WIND OPERABLE WIPER FOR USE WITH A FACE PROTECTOR
Filed May 20, 1952  4 Sheets-Sheet 2

INVENTOR:
JAN POEDER
BY:

March 13, 1956 J. POEDER 2,737,658
WIND OPERABLE WIPER FOR USE WITH A FACE PROTECTOR
Filed May 20, 1952 4 Sheets-Sheet 3
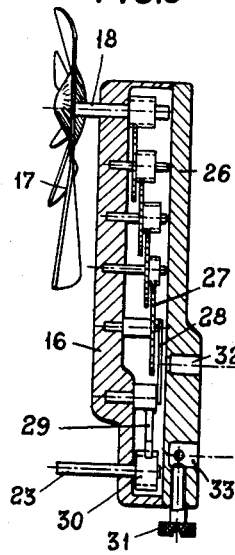
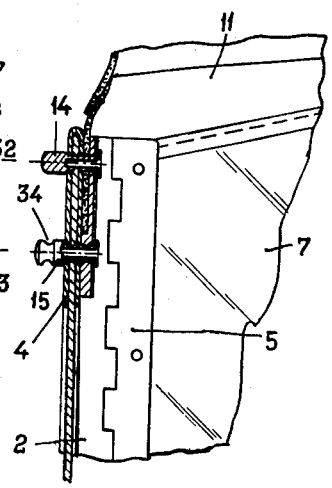
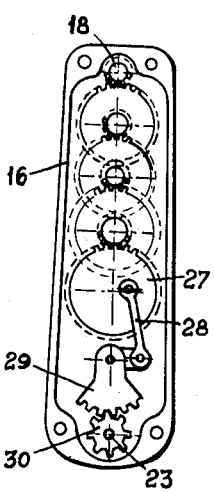
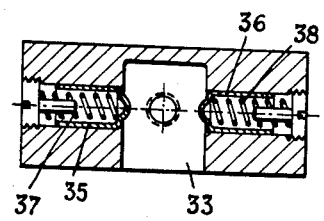
INVENTOR:
JAN POEDER
BY:

March 13, 1956 J. POEDER 2,737,658
WIND OPERABLE WIPER FOR USE WITH A FACE PROTECTOR
Filed May 20, 1952 4 Sheets-Sheet 4
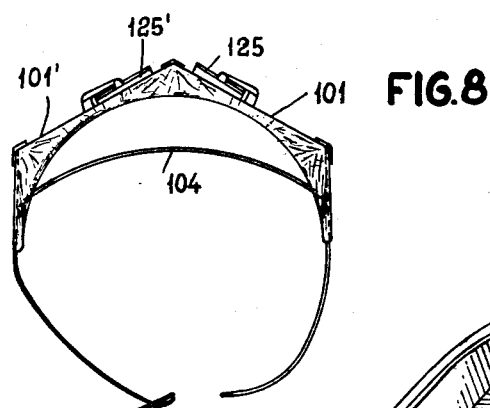
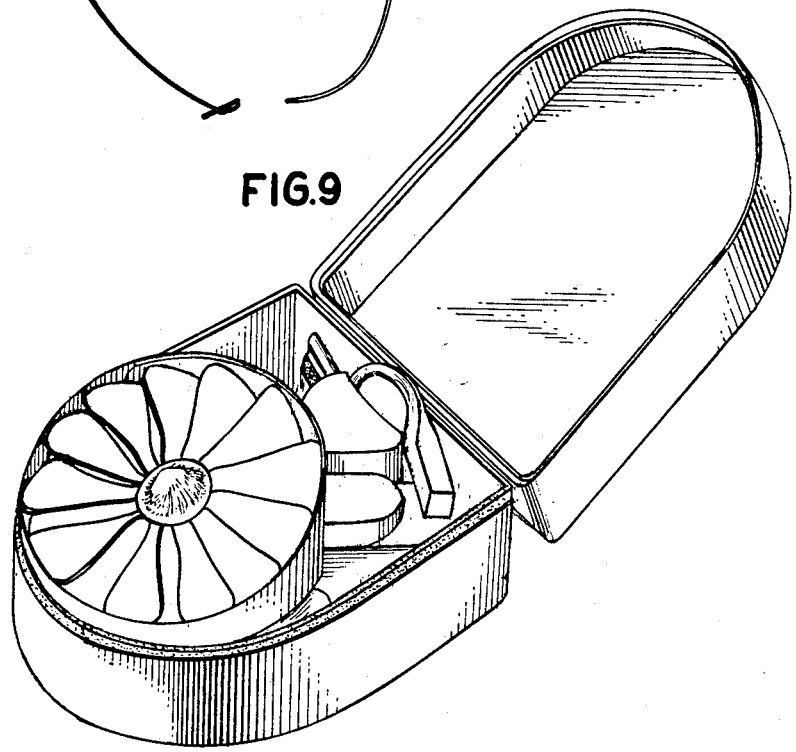
INVENTOR:
JAN POEDER
BY:

United States Patent Office 2,737,658
Patented Mar. 13, 1956

2,737,658

WIND OPERABLE WIPER FOR USE WITH A FACE PROTECTOR

Jan Poeder, Assen, Netherlands

Application May 20, 1952, Serial No. 288,920

1 Claim. (Cl. 2—9)

The invention relates to an improved wind shield for motorcyclists. Motorcyclists and occupants of other open vehicles have much inconvenience from rain, snow or hail beating against the face.

An object of the invention is to construct a wind shield with at least one wiper driven by an airscrew and cleaning a flat shaped part of the shield, this shield being sufficiently ventilated so that the breathing cannot cloud the shield.

Another object of the invention is to construct a wind shield on which is detachably mounted an airscrew with a wiper, so that the separate parts can easily be put into a pocket.

A further object of the invention is to construct a wind shield with a wiper having an adjustable speed.

A further object of the invention is to construct a wind shield with a wiper driven by an airscrew of light weight so as not to fatigue the wearer.

A further object of the invention is to construct a wind shield with a wiper, which shield is of sufficient length to protect the whole face, but nevertheless is not pressed by the wind against the face so that the wearer is not bothered by it.

Other objects of the invention will become apparent hereinafter in the specification.

In rainy weather the use of goggles or another known protecting device for motorists is unsuitable, since the raindrops covering the outside of the glass restrict vision, and moreover the inside of the glass gets clouded with moisture, as the space behind the glass is insufficiently ventilated.

It is proposed to provide goggles with a wiper, driven by an airscrew, windwheel or the like; however, the disadvantage that the inside of the goggles gets clouded with moisture remains.

It is also known, to use curved face shields, sufficiently protecting the face, said shields being provided at the top with head bands of leather, sealed to the shield. These shields are not provided with an automatic wiper and cannot easily be taken along, since they are too big to put them into a pocket.

These objections are generally overcome by the instant invention which provides a wind shield of sufficient length to protect the whole face, comprising a front part and two side parts hingedly or pivotally connected thereto, and of translucent material, said front part having at least one flat shaped part, a strip of pliant material attached to the upper side of said front part and said side parts and adapted to seal the space between the shield and the forehead of the wearer and provided with a strap to fix the shield on the head of the wearer, a strap fixed in the lower part of the shield which rests against the foreside of the chin of the wearer and keeps the shield at a distance from the face, and a detachably mounted wiper driven by an airscrew and cleaning at least the flat shaped part of the wind shield being in front of the eyes of the wearer. A reduction gearing is provided between the airscrew and the wiper, as well as means to reverse the rotary motion of the windscrew into an oscillation.

Experiments have shown that with a wind shield as described safe driving, even at speeds of over 60 miles per hour, is possible, even by heavy rain, and that also at a low speed of e. g. 12 miles per hour the wiper operates effectively.

The means by which I obtain my objects will be more fully described in the following specification, where some embodiments of the invention are explained in connection with the drawings, in which:

Fig. 4 is a part of a cross sectional view along the line IV—IV of Fig. 2;

Fig. 5 is a cross sectional view of the housing, and a view of the enclosed gearing between the airscrew and the wiper;

Fig. 6 is a rear front view of this housing and the gearing, the cover lid being removed;

Fig. 7 is an enlarged cross sectional view through the cover lid of the housing of Fig. 5;

Fig. 8 is a plan view of another embodiment of the invention;

Fig. 9 is a perspective view of the housing with wiper and airscrew, put into a box for carrying this part in the pocket.

Figure 1:
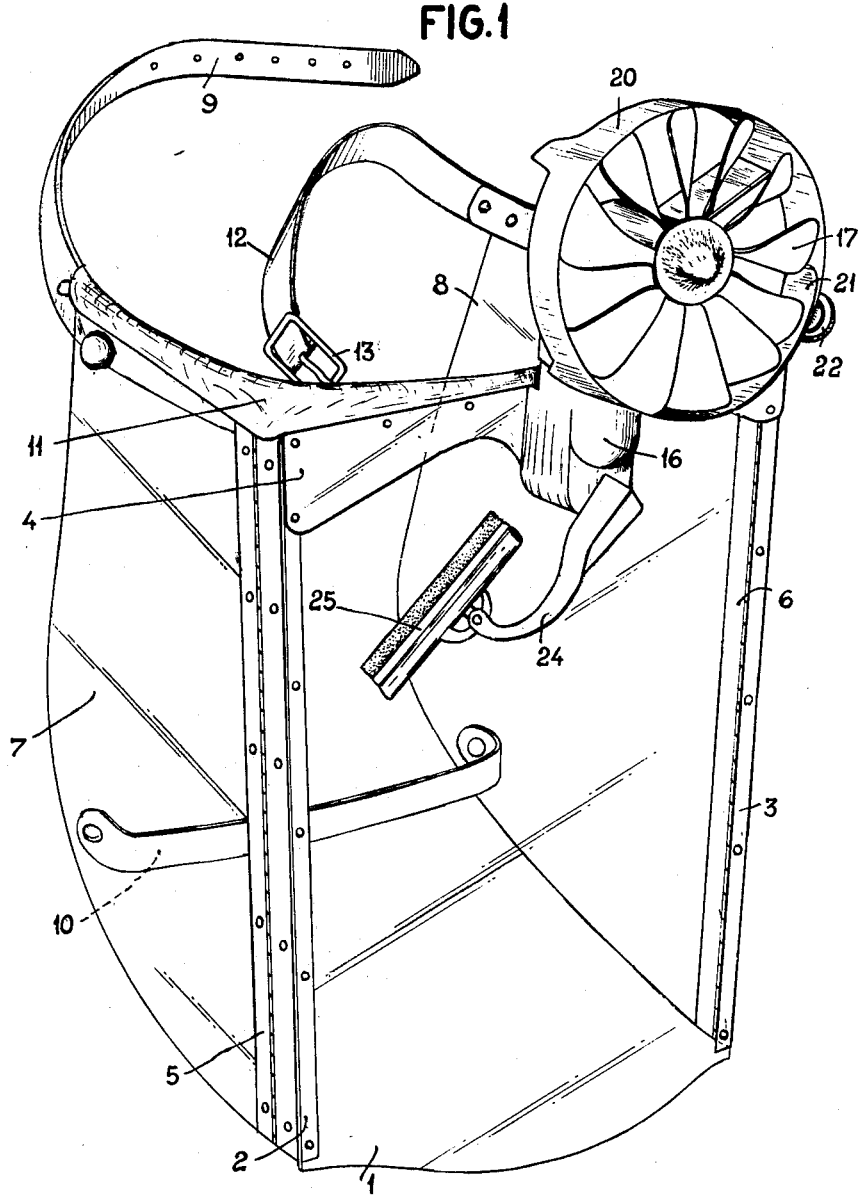
Fig. 1 is a perspective view of one form of the wind shield.
Figure 2:
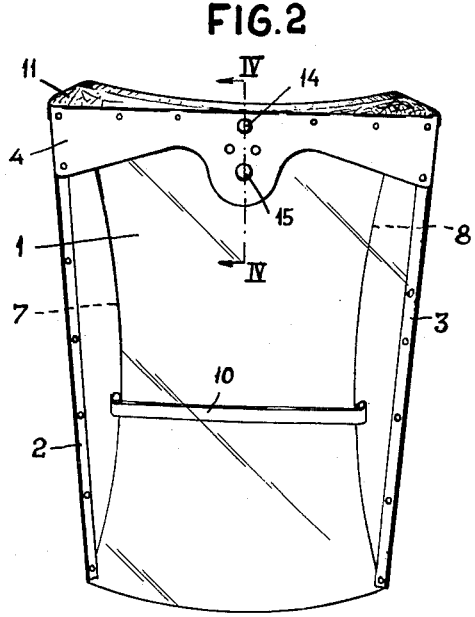
Fig. 2 is a front view on a reduced scale of the wind shield of Fig. 1 without the part formed by the housing with the airscrew and wiper.
Figure 3:
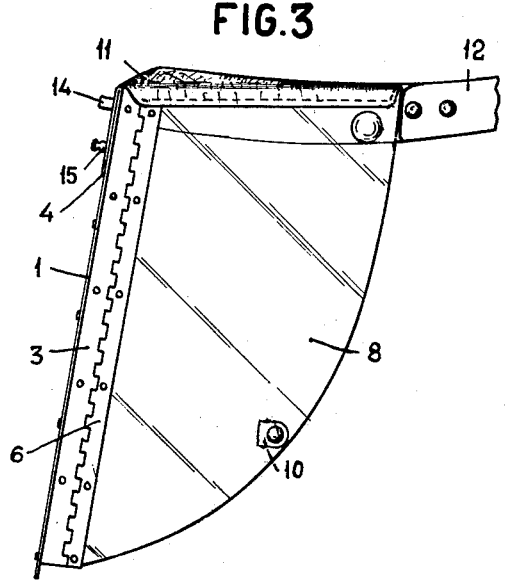
Fig. 3 is a side view of the shield of Fig. 2, also on a reduced scale.

In these figures the forefront of the wind shield is indicated with 1. This forefront, which may be of cellon or another translucent material, is mounted on a metal frame comprising a flat part 4 at the upper side and vertical L-shaped strips 2, 3. To these strips 2, 3 are fastened metal strips 5, 6 hingedly; on these last mentioned strips are fixed side panes 7, 8, which are also of translucent material. To these side panes 7, 8, is fastened a strap 10, which rests against the chin of the wearer, and keeps the shield at a distance from the face, even when a heavy wind tries to press it against the face.

At the upper side of the shield is fastened a strip 11 of leather or other pliant material, which is adapted to the shape of the head and prevents ingress of rain, hail or snow. Straps 9, 12 of pliant material, one of which provided with a clasp 13, serve for fastening the shield on the head of the motorist.

On the part 4 of the metal frame of the forefront are fastened two bolts 14, 15, intended for attachment of the housing 16. Bolt 15 is provided with a circular groove 34. In this housing are mounted the gearing wheels, retarding the speed of rotation of the windscrew 17, which is fixed on the spindle 18, extending from the forefront of the housing. Around the windscrew 17 is mounted a metal ring 20. In this ring is fixed a flat spring 21, which by screw 22 can be brought into contact with the outside of the blades of the windscrew, permitting to decrease the speed of rotation during the driving or stopping it. On the lower side of the forefront of the housing extends a spindle 23, having a reciprocating motion. On this spindle 23 is fixed an arm 24 with the wiper 25 which is of a type, well known to everyone skilled in the art. The arm 24 can be turned upwards from the front pane 1.

After the housing with the wiper and airscrew has been removed, the shield can be folded to a flat packet, which can easily be put into a pocket of a motor jacket.

In the Figures 5, 6 and 7 are given some details of the housing with the gearing. The housing 16 is provided at the rear with the cover lid 26.

The speed of rotation of spindle 18, driven by the windscrew 17, is reduced to a lower value by the pinions and cogwheels, so that the cogwheel 27 has a rotation speed, which approximately is 1/60 of the speed of rotation of the windscrew. By the crank 28 the rotation of the wheel 27 is transformed into a reciprocating motion of the toothed rack 29, and this organ communicates an oscillating movement to the cogwheel 30, fixed on spindle 23, to which spindle is attached the wiper.

In the lid, fastened to and covering the rear front of the housing with the gearing, are two holes 32, 33, in which fit the bolts 14, 15 of the shield. Bolt 15 is provided with a circular groove 34. When the housing is pressed on the shield, the pins 35, 36, pressed by springs 37, 38, spring into the circular groove 34. Screw 31 serves for still stronger attachment of the housing to the shield.

In the embodiment, indicated in Figure 8, the front of the shield is made in two panes 101, 101¹, each of which is flat and each of which is provided with a wiper 125, 125¹. A single airscrew with gearing, not indicated in the figure, is sufficient to drive both the wipers.

Having now described means by which the objects of this invention are obtained, what I claim is:

For use with a face protective device, a wind operable wiper means comprising, in combination, a housing; means for detachably mounting said housing on said protective device; a plurality of reducing gears rotatably mounted within said housing; a plurality of vanes mounted on said housing for rotation by the wind, said vanes being connected to the first of said reducing gears; means for adjustably restricting the rotation of said vanes; and at least one wiper blade mounted on the last of said reducing gears whereby the motion of the wind rotates said vanes at a speed partially determined by said restricting means and said rotating vanes drive said wiper blade through said reducing gears at a speed proportionally lower than the speed of rotation of said vanes.

References Cited in the file of this patent

UNITED STATES PATENTS

| | | |
|---|---|---|
| 825,288 | Ash | July 10, 1906 |
| 1,210,407 | Boucher | Jan. 2, 1917 |
| 1,401,572 | Willson et al. | Dec. 27, 1921 |
| 2,277,090 | Feiler | Mar. 24, 1942 |
| 2,288,429 | Baughn | Jan. 30, 1942 |
| 2,625,684 | Magnusson | Jan. 20, 1953 |

FOREIGN PATENTS

| | | |
|---|---|---|
| 222,225 | Great Britain | Oct. 2, 1924 |
| 342,906 | Great Britain | Feb. 12, 1931 |
| 413,447 | Great Britain | July 19, 1934 |
| 208,442 | Switzerland | July 1, 1940 |
| 460,229 | Germany | May 23, 1928 |